United States Patent [19]

Macken

[11] 4,430,549
[45] Feb. 7, 1984

[54] METHOD AND APPARATUS FOR PRODUCING DECKLE-EDGED PAPER

[76] Inventor: John A. Macken, P.O. Box 696, Santa Rosa, Calif. 95402

[21] Appl. No.: 371,539

[22] Filed: Apr. 26, 1982

[51] Int. Cl.³ .............................................. B23K 27/00
[52] U.S. Cl. ...................... 219/121 LG; 219/121 LQ; 219/121 LN; 219/121 LW
[58] Field of Search .................. 219/121 LA, 121 LB, 219/121 LG, 121 LP, 121 LQ, 121 LR, 121 LW, 121 LN

[56] References Cited

U.S. PATENT DOCUMENTS 3,860,784  1/1975  Brown .................. 219/121 LD
4,049,945  9/1977  Ehlscheid et al. ........... 219/121 LG

FOREIGN PATENT DOCUMENTS 2310846  12/1976  France ........................ 219/121 LG
1442002   7/1976  United Kingdom ........ 219/121 LG

*Primary Examiner*—C. L. Albritton
*Attorney, Agent, or Firm*—Edward E. Roberts

[57] ABSTRACT

A laser apparatus and method for producing a deckle edge on laser cut paper, the apparatus including a laser source projecting a laser beam intercepted by an optical device for providing a line focus of the beam on the paper, with the line focused beam having an energy gradient on the paper adjacent the intended edge, the movement of the paper relative to the beam, in conjunction with the inhomogeneous nature of the paper providing a deckle edge having differing degrees of etch adjacent the cut edge. The optical device is a spherical mirror set off-axis relative to the primary laser beam.

10 Claims, 3 Drawing Figures

METHOD AND APPARATUS FOR PRODUCING DECKLE-EDGED PAPER

BACKGROUND OF THE INVENTION

The background of the invention will be discussed in two parts:

1. Field of the Invention

This invention relates to laser apparatus for cutting paper, and more particularly to laser apparatus for producing deckle edged paper cuts.

2. Description of the Prior Art

Laser apparatus has been extensively used for etching images or patterns in wood and objects of other materials. More recently, laser energy has been used to cut paper. Certain paper products, for example paper used for greeting cards or writing stationery, have irregular edge configurations, which give the impression of having been aged or torn along the edge. This type of edge is referred to as a "deckle edge."

Current processes for producing a deckle edge are expensive and time-consuming. Initially, with current means, a special paper formulation is employed. Also, the process for producing this irregular edge uses mechanical means, which make physical contact with the paper, thus resulting in a very slow process as compared with normal paper-processing standards.

Accordingly, it is an object of the present invention to provide a new and improved laser apparatus and method for producing a deckle edge on paper.

It is another object of the present invention to provide a new and improved laser apparatus and method for producing a deckle edge on two pieces of paper simultaneously.

It is a further object of the present invention to provide a new and improved non-contact laser apparatus and method for producing a deckle edge on paper.

Other objects, features and advantages of the invention will become apparent from a reading of the specification, when taken in conjunction with the drawings, in which like reference numerals refer to like elements in the several views.

DEFINITIONS

Figure 1:
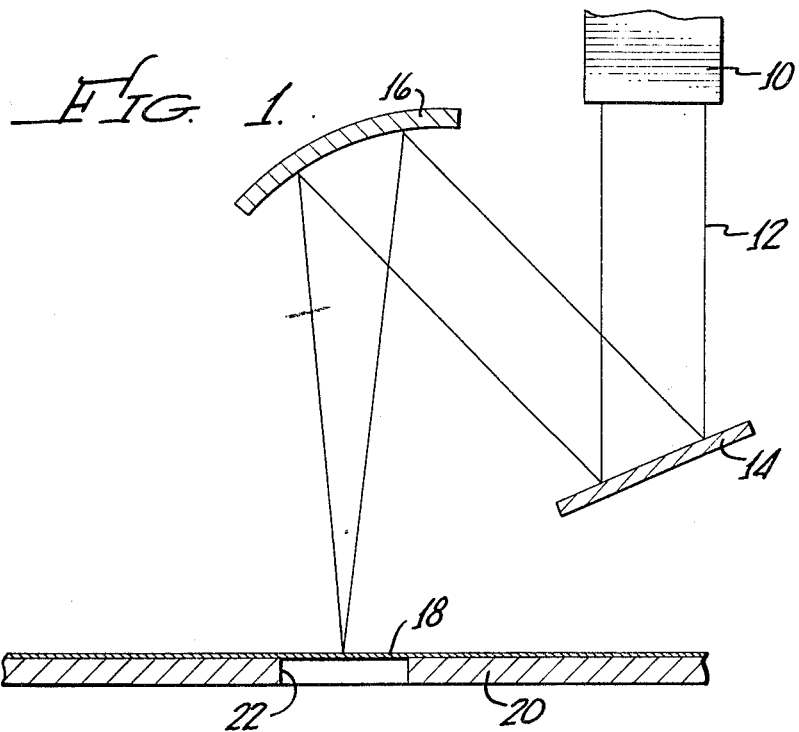
FIG. 1 is a diagrammatic view of the laser apparatus according to the invention.

1. Laser power density-the watts/cm$^2$ of a laser beam at the particular point and time.
2. Critical power density-the experimentally determined laser power density where acceptable vaporization of a substance begins.
3. Laser energy density-the joules/cm$^2$ of laser light which fall on a particular area.
4. Useful laser energy density-the summation of laser energy density using only times when the critical power density was exceeded.

DESCRIPTION OF THE PREFERRED EMBODIMENT

It is well known to those skilled in the art that focused laser beams can produce a sharp, clean cut in paper, which is not readily distinguishable from shear cut paper. Although any laser can be used for this purpose, a carbon dioxide laser is preferred, this laser emitting at a long infrared wavelength, which is strongly absorbed by paper. Even a white piece of paper, which is highly reflective at visible wavelengths, strongly absorbs nearly all of the light energy from a carbon dioxide laser. For ordinary paper cutting applications, a 100 watt carbon dioxide laser would be a typical size apparatus.

In laser cutting, the absorbed energy heats the paper. If the laser light is focused to a power density range of a few hundred to a few thousand watts per square centimeter, the result of scanning such a laser across a piece of paper is to produce a singed or charred appearance. Further forcusing of the laser beam increases the power densities until eventually a critical power density is reached where clean and acceptable varporization begins (in excess of 10,000 w/cm$^2$ for paper). The useful laser energy density necessary for cutting completely through the paper is proportional to the thickness and density of the paper. For example, it has been found that to cleanly vaporize through a standard sheet of paper with a thickness of 0.1 millimeter, it is necessary to deposit a useful laser energy density of about 40 joules per square centimeter. Thus if a laser beam was focused to a power density of 40,000 watts per square centimeter, it would have to be scanned along the surface of the paper at a rate so that, for any given point on the line, the beam would remain for only one thousandth of a second to deposit only 40 joules per square centimeter on the point. During that time span, the laser beam would have just barely cut through a single sheet of paper of 0.1 millimeter.

Optimally, to insure the cutting of the paper, the time on any given point may be increased by slowing down the rate of movement of the paper relative to the laser beam. Conversely, if less energy is deposited, the laser beam will cut partially through the paper, but not completely through. In experiments with laser cutting of paper, it has been found that there are certain inhomogeneous properties of paper, in that for a given energy density and a given scanning rate, there are certain zones of the paper which are completely cut through and other regions which are not quite completely removed. This is to say, for example, that in certain papers, there might be minute regions which only require 30 joules per square centimeter for cutting through the thickness of the paper, with other regions requiring intermediate amounts of laser energy density between 30 and 40 joules per square centimeter. This difference can be traced to random density variations in the paper.

The apparatus and method to be hereafter described makes use of this inhomogeneous property of the paper to rapidly produce a deckle edge in paper without physical contact. Briefly the apparatus and method contemplates configuring the laser beam at the point of contact with the paper in such a way to provide an energy density gradient across the scanned laser beam. At some region, the useful energy density exceeds the amount required for vaporization completely through even the highest density areas of the paper. This scanned zone becomes the cut edge. There is decreasing energy density away from the cut line. This zone of lesser density, combined with the lack of homogeneity in the paper thus results in some parts being cut partially through to produce an irregular deckle edge. By taking a larger sheet and cutting down the mid point, two deckle edges are simultaneously produced if the "contoured" laser beam is symmetrically configured. In order to prevent charring of the paper, it is necessary to exceed the critical power density required for clean vaporization, even in areas where the integrated energy density of the scanned beam is insufficient to completely vaporize through the paper. It is true that at some zone, the power density of the laser beam falls below the critical power density, but as a practical matter, the zone can be kept small enough that no charring is visible.

Referring now to the drawings, and particularly to FIG. 1, there is shown a laser apparatus according to the invention, the apparatus consisting of a laser source 10 directing a laser beam 12 toward a flat mirror 14, which reflects the beam 12 toward a curved mirror 16, which reflects the beam toward the paper 18 suitably supported by a stationary plate 20 having an aperture 22 therein along the line at the focus of the beam 12 on paper 18.

In ordinary paper cutting applications the laser beam is brought to a round finite diameter focus at the point of contact with the paper. In the instant apparatus however, this is not true. The curved mirror 16 is a spherically curved mirror which is set off-axis to the laser beam 12 so that there is an angular difference between the angle of incidence and the angle of reflection of the laser beam 12. The angle of incidence compared to the angle of reflection of the laser beam 12 striking mirror 16 is purposely made large to accentuate spherical aberration effects, which are inherent and generally undesirable in spherically curved mirrors. However, in the instant invention, this "undesirable" effect is used to advantage in "shaping" the beam. When the angular difference between the incident and reflected beams exceeds about 10°, the effect of spherical aberration becomes noticeable to the eye. When this angular difference exceeds 20°, there is no distinct focus point, but rather there are two focus regions; the first one producing a line focus, which, in FIG. 1, would extend out of the plane of the paper 18, and the second region, somewhat below the first, would produce a second line focus which would lie in the plane of the paper 18. Therefore, by making use of the spherical aberration property, it is possible to have the laser beam come to a line focus, rather than a circular focus, the length of the line focus being determined by the diameter of the laser beam approaching the mirror 16, the degree of aberration introduced by using curved mirror 16 off axis, and the focal length of the curved mirror to the line focus.

By reference to FIG. 1, the laser beam 12 reflected from the surface of curved mirror 16 is shown as converging to a point in the plane of the paper 18, this point being the line focus in end view, that is, the direction of the line focus extends perpendicular to the plane of the drawing. The paper 18 is being moved or translated from right to left as viewed in FIG. 1, in the direction of the arrow thereabove. Effectively, the drawing shows the edge of the cut line of the paper 18.

Figure 2:
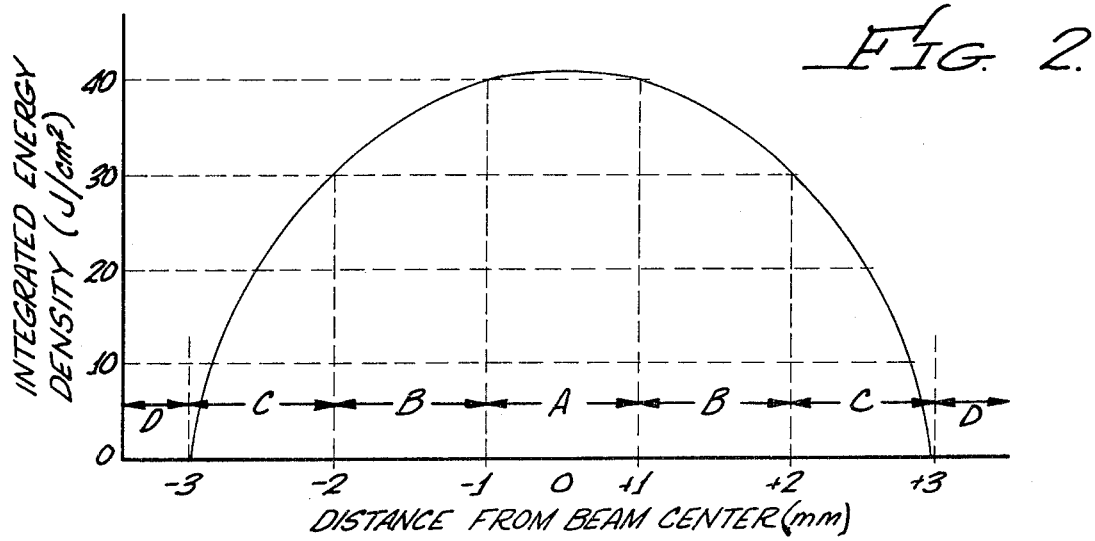
FIG. 2 graphically depicts the energy distribution of the laser beam impacting on the paper using the apparatus of FIG. 1.
Figure 3:
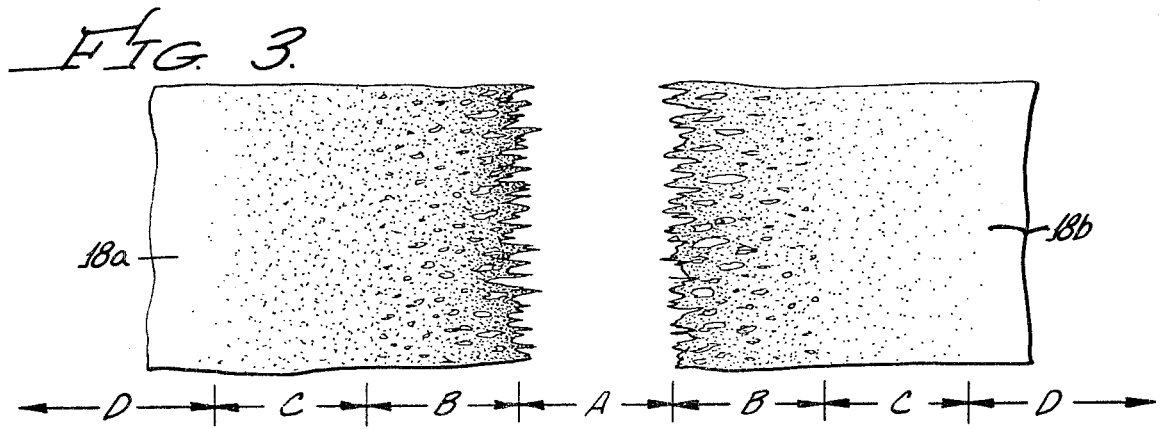
FIG. 3 is a partial plan view of the laser cut paper correlated to the graph of FIG. 2.

By reference to FIGS. 2 and 3, in conjunction with FIG. 1, a detailed explanation of the results of the cutting operation will be provided. As shown in FIG. 2, with the line focused laser beam, an energy density gradient is provided, these zones of energy density being set out on the horizontal scale numbered from "0" at the mid-point (which corresponds to the center of the laser beam 12) to ±3 (this being in millimeters on either side of the center of the beam). The focused laser beam is 6 millimeters wide (in the direction perpendicular to the plane of the drawing of FIG. 1) and 0.5 millimeters wide (in the direction of movement of the paper 18 in FIG. 1). The vertical scale in FIG. 2 is calibrated in useful energy densities of joules per square centimeter, from 0 to 40. FIG. 3 is labeled and aligned to correspond to the zones designated "A" to "D" in FIG. 2 to facilitate discussion of the energy density impacting on a particular portion of the paper 18 as the laser beam 12 is scanned.

As previously discussed, with paper 18 being a single sheet of 0.1 millimeter in thickness, total vaporization occurs with energy densities of, or more than 40 joules per square centimeter. This corresponds to zone A, which as can be seen in FIG. 2 provides this amount of energy density for completely removing that portion of the paper 18, thus dividing the paper into portions 18a and 18b, shown in FIG. 3. Zone B on either side of the center of the curve in FIG. 1 provides energy densities impacting on the paper 18 of magnitudes between 30 and 40 joules per square centimeter. In this case, referring to FIG. 3, Zone B of the sheets 18a and 18b show irregular penetration or deckle edge resulting from this particular energy density of the impacting laser beam acting on the non-homogeneous nature of the paper 18.

With respect to zone C in sheets 18a and 18b, the energy density impacting thereon varies between 0 and 30 joules per square centimeter. This energy is insufficient for penetrating the paper, but is sufficient for "etching" the paper, or reducing the thickness of the paper. In zone D, the laser beam does not impinge, and consequently the paper in this region is of the original thickness. In the C zone, the thickness will likewise vary within a range, due to the inhomogeneity of the paper as well as the differing amounts of energy density depending on the distance from the center of the beam. As shown in FIG. 3, two deckle edges are produced at the same time, in roughly symmetrical configuration on sheets 18a and 18b.

With respect to the energy density curve of FIG. 2, it is to be understood that the curve depicted therein results from the particular optical device; that is, the use of the spherically curved mirror 16 with its axis offset relative to the axis of the laser beam 12, taking into consideration the aberrations, to effect a line focus. Alternatively, additional tailoring of the beam can be effected by introducing apertures to the beam. For example, if the beam was passed through a diamond-shaped aperture, then the resulting curve of integrated energy density could be made more nearly triangular. Other apertures or techniques may be readily employed to achieve energy distribution patterns over a broader width or of different configuration within the skill of the art. It should also be understood that a line focus can be achieved through the use of lenses, especially cylindrical lenses, or even cylindrical mirrors. Although the use of a line focus is not absolutely necessary, it is the most practical method of simultaneously exceeding the 10,000 watts per square centimeter power density for clean vaporization of paper, while achieving a wide density curve similar to that shown in FIG. 2. For example, if a round 6 millimeter diameter beam were used, the total laser power required would have to exceed 3,000 watts. When a line focus of 0.5 mm by 6 mm is used as described, then a 300 watt laser beam is sufficient.

It is also possible to produce the equivalent of a line focus by very rapidly scanning a circular focus point back and forth along a line. If the scan rates are sufficiently high, then the results will begin to appear the same as an elongated focus line. For this to occur, the scan frequency which must be achieved or exceeded is as follows:

$$F = S/W$$

where
F = scan frequency
S = translation speed of the paper relative to the laser beam
W = the width of the laser beam spot in the direction of the paper motion.

It should be noted that the irregularities discussed in the production of the deckle edge result, in large part, from the inhomogeneities in the paper itself. It is also possible to accentuate the irregularity of the edge if time-varying movements are also introduced into the laser beam. This is not easily accomplished by introducing small angle scanning motions to the laser beam 12. That is to say that, rather than the laser beam remaining perfectly still and the paper moving, the laser beam also undergoes small displacements, preferably side-to-side perpendicular to the motion of the paper. These motions could be achieved by a slight scanning of mirror 14 or mirror 16, for example. If these deflections were of a random nature, the effect would be to accentuate the irregularity of the deckle edge. If the deflections were of a repetitive nature, then a periodic pattern would be introduced into the deckle edge. In this example, a line focus would be used, but there would also be scanning of the line focus at frequencies below the critical frequency defined by the above formula. In addition, a point focus could be used if the beam was scanned with frequency components above the below the above-mentioned critical scanning frequency. This would likewise result in a deckle edge with an accentuated irregularity.

In either event, the laser beam 12, at the point of impact with the paper 18 is contoured, or configured, to provide a useful energy density gradient from a "maximum" zone, where the energy density is sufficient for vaporization of the paper 18 completely through, cutting the paper, to one or more intermediate zones of energy density, where the laser energy is sufficient to at least vaporize partially through the paper, the energy in the intermediate zones reducing the paper in thickness, while further taking advantage of the inhomogeneities of the paper to provide the irregular deckle edge. In one instance the gradient is provided optically by use of the spherically curved mirror 16, while in the later described method, it is done by scanning of the mirror or the laser beam in a direction perpendicular to the direction of movement of the paper. With the scanning method, the equivalent of the line focus is readily achieved. In either case, the irregularity can be enhanced by scanning of the beam below the critical frequency perpendicular to the direction of motion of the paper.

It should be understood that in the above examples, it was presumed that the relative motion between the paper and the laser beam was achieved mainly by moving the paper. However, the paper could be stationary and the scanning achieved only by movement of the laser beam.

While there has been shown and described a preferred embodiment, it is to be understood that other modifications may be made without departing from the spirit and scope of the invention.

I claim:

1. In a laser apparatus for cutting paper, the combination comprising:
   means for supporting the paper to be cut;
   a laser source for projecting a laser beam;
   means for providing relative movement between the paper and said laser beam; and
   means for providing a line focus of the laser beam at the surface of the paper having an energy density gradient at the paper surface in a direction generally perpendicular to the direction of relative movement, the energy density gradient having a first zone for completely vaporizing the paper and at lease one other zone for at least partial reduction of thickness of the paper whereby to form an irregular deckle edge on said paper.

2. The combination according to claim 1 wherein said means for focusing includes optical means for providing said line focus at the surface of the paper.

3. The combination according to claim 2 wherein said optical means is a curved mirror intercepting the laser beam off axis thereby accentuating aberration effects for providing said line focus.

4. The combination according to claim 3 wherein said currved mirror is a spherically curved mirror and said off axis intercepting of the laser beam provides an angular difference between the angle of incidence and the angle of reflection of said laser beam thereby accentuating spherical aberration effects.

5. The combination according to claim 1 wherein said means for focusing includes:
   means for scanning the laser beam in a direction generally perpendicular to the direction of movement of the paper;
   means for focusing the laser beam on the paper to a power density of at least 10,000 w/cm$^2$; and
   said first zone is completely vaporized through the paper and said other zone is accentuated to reduced thickness and partial penetration of the paper.

6. The combination according to claim 1 wherein said means for focusing includes a mirror scanning through small angles for scanning the laser beam in a direction generally perpendicular to the direction of movement of the paper.

7. In a laser apparatus, the combination comprising:
   a laser source for providing a laser beam;
   a spherically curved mirror for intercepting said laser beam, said mirror providing a circular focus point in a predetermined plane;
   means for supporting a sheet of paper in said predetermined plane; and
   means for providing rapid relative scanning movement between said paper and said laser beam in a direction generally perpendicular to the direction of said focus for cutting said paper and for providing an irregular edge thereon, the frequency of said scanning movement equal to or greater than the translation speed of the paper relative to the laser beam divided by the width of the laser spot in the direction of the paper motion.

8. In a method for laser cutting and deckle edging of paper, said method comprising:
   providing a laser beam;
   contouring the laser beam configuration at the surface of the paper over a finite width for providing a first zone having an energy density sufficient for complete vaporization of the paper and at least one other contiguous zone having an energy density sufficient for at least partial removal of the paper; and providing relative movement between the laser beam and the paper in a direction generally perpendicular to the width of the beam for cutting the paper while creating a deckle edge.

9. The combination according to claim 8 wherein said step of contouring includes placing a spherically curved mirror for intercepting the laser beam at a point offset from the axis thereof for creating a line focus on the surface of the paper.

10. The combination according to claim 8 wherein said step of contouring includes scanning the laser beam through a small angle in a direction transverse to the direction of relative movement.

* * * * *